United States Patent

Buckler

[15] 3,681,336

[45] Aug. 1, 1972

[54] N-(3-PHENYL-2H-TETRAZOLE)-ALKANOYL AMINES

[72] Inventor: Robert Thomas Buckler, Elkhart, Ind.

[73] Assignee: Miles Laboratories, Inc., Elkhart, Ind.

[22] Filed: Dec. 24, 1969

[21] Appl. No.: 888,068

[52] U.S. Cl...260/247.5 R, 260/308 D, 260/294.7 E, 424/248
[51] Int. Cl. ............................................C07d 87/40
[58] Field of Search......260/247.5 R, 308 D, 294.7 E

[56] References Cited

UNITED STATES PATENTS

| | | | |
|---|---|---|---|
| 3,083,204 | 3/1963 | Klavehn et al. | 260/292 |
| 3,450,750 | 6/1969 | Cragoe | 260/521 |
| 3,452,079 | 6/1969 | Shen et al. | 260/469 |
| 3,453,312 | 7/1969 | Sprague et al. | 260/455 |
| 3,517,051 | 6/1970 | Bolhofer | 260/473 |
| 3,453,285 | 7/1969 | Hayao | 260/308 |

*Primary Examiner*—Alex Mazel
*Assistant Examiner*—Jose Tovar
*Attorney*—Joseph C. Schwalbach, Michael A. Kondzella, Louis E. Davidson and Harry T. Stephenson

[57] ABSTRACT

A series of amide derivatives of omega-5-aryl-2-tetrazolyl-alkanoic acids derived from cyclic amines. These compounds are useful as anti-inflammatory agents.

8 Claims, No Drawings

N-(3-PHENYL-2H-TETRAZOLE)-ALKANOYL AMINES

SUMMARY OF THE INVENTION

This invention relates to a novel series of chemical compounds having useful pharmacological properties. The compounds are omega-5-aryl-2-tetrazolyl alkanoic acid amides in which the aryl moiety is substituted with at least one halogen atom and the amide moiety is formed from a heterocyclic amine.

The compounds of this invention may be represented by the structural formula

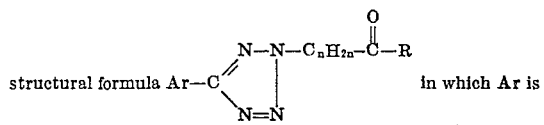

in which Ar is halogen substituted phenyl, $n$ is 1 to 4, and R is a monocyclic heterocyclic nitrogen-containing radical in which the attachment to the carbonyl group is through the nitrogen atom. For example R may be piperidyl, pyrrolidyl, or morpholino.

The novel compounds of this invention can be readily prepared by amination of a tetrazolyl acyl halide using the appropriately substituted tetrazolyl alkanoic acid as a precursor for the acyl halide, which is readily formed by halogenation thereof. Suitable halogenating agents include cyanuric chloride, phosphorus pentachloride, thionyl chloride and the like. The tetrazolyl acyl halide is then aminated using the appropriate cyclic amine. Although the conditions of the reactions are not critical, it is preferred to conduct the halogenation in a suitable solvent such as chloroform. The amination reaction is also suitably conducted in a solvent for the amine. Suitable solvents include tetrahydrofuran and the like. The halogenation reaction may be advantageously conducted under reflux while the amination reaction is satisfactorily run at room temperature. Other solvents for the halogenation reaction are benzene and toluene and other halogenating agents are thionyl bromide and phosphorus oxychloride.

The omega-5-aryl-2-tetrazolyl alkanoic acid starting materials may be prepared in accordance with the procedure described in U.S. Pat. No. 3,453,285 to Shin Hayao.

Preparation of these compounds may be illustrated in the following series of equations in which the various radicals are as indicated above.

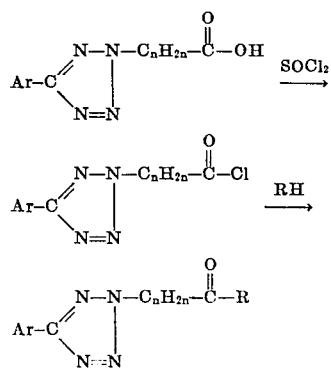

The compounds of this invention are useful as anti-inflammatory agents.

Suitable medications may be prepared by combining one or more of the compounds of this invention as an active ingredient with fillers, carriers, extenders and excipients generally used in pharmaceutical formulations. Medications may be prepared in solid or liquid states as tablets, capsules, suspensions and similar dosage forms suitable for oral, intraperitoneal and other convenient means of administration. The active ingredients may be mixed with common diluents or tableting adjuncts such as cellulose powder, corn-starch, lactose, talc and the like according to accepted manufacturing practices. Unit dosages (in mg.) of active ingredients in the medication may be varied so that the amount used is adequate to provide the desired therapeutic result without untoward side effects and to permit satisfactory variation in dosages administered.

Anti-inflammatory activity was observed when medications including compounds of this invention as an active ingredient were administered orally to randomly selected groups of rats weighing between 260 and 400 grams. The active ingredients were evaluated according to a procedure in which pleurisy was induced by interpleural administration of Evans Blue and Carrageenen (0.075 percent Evans Blue–0.025 percent Carrageenen). The anti-inflammatory medication was given orally 1 hour before the interpleural administration of the solution. At 6 hours the animals were sacrificed and the pleural exudate was measured.

Groups of seven animals were used for each evaluation. In this assay phenylbutazone produced a percent decrease in pleural exudate of 31.1 percent. By way of comparison the compound of Example 1 produced a percent decrease of 61.2 percent. The relative potency of this compound at 95 percent confidence levels determined at half log dose intervals compared to phenylbutazone was therefore 4.98 to 1 [3.61–5.36]. Other compounds of this invention gave similar results.

DESCRIPTION OF THE PREFERRED EMBODIMENTS

EXAMPLE 1

N-3-[5'-(3''-(3''-Bromophenyl)-2'H-tetrazole]propionyl piperidine

A mixture of 32 g. (0.108 mole) of 3-[5'-(3''-bromophenyl)-2'H-tetrazole]propionic acid and 80 g. of thionyl chloride in 250 ml. of dry chloroform was stirred under reflux for 16 hours. Evaporation of the solvent and excess reagent under reduced pressure gave a tan oil which was redissolved in 300 ml. of dry tetrahydrofuran. To this was added 20 ml. of redistilled piperidine in 100 ml. of dry tetrahydrofuran. The mixture was stirred for 15 minutes at room temperature. The tetrahydrofuran was then removed under reduced pressure and the residue well triturated with one liter of 0.1 N hydrochloric acid. The resulting semi-solid was taken up in 700 ml. of ether and extracted with 300 ml. of 3 percent aqueous sodium bicarbonate solution. The ether solution was then dried over calcium chloride, filtered, and cooled in the refrigerator. This deposited 25 g. (69 percent) of tan needles, mp. 69° C., of N-3-[5'-

(3''-bromophenyl)-2'H-tetrazole]propionyl-piperidine.

Calculated for $C_{15}H_{18}N_5OBr$; C, 49.46; H, 4.98.
Found: C, 49.66; H, 5.49.

The infrared spectrum (10 percent, $CHCl_3$) displayed the expected tertiary amide absorption at 1,640 $cm^{-1}$.

EXAMPLE 2

N-3-[5'-(3''-Fluorophenyl)-2'H-tetrazole]
propionylpiperidine

Using the procedure of Example 1, there was obtained from 7 g. (0.029 mole) of 3-[5'-(3''-fluorophenyl)-2'H tetrazole]propionic acid, 8 g. (91 percent) of N-3-[5'-(3''-fluorophenyl)-2'H-tetrazole]propionyl-piperidine, mp 95° C., after recrystallization from aqueous ethanol.

Calculated for $C_{15}H_{18}FN_5O$; C, 59.40; H, 5.94.
Found: C, 59.33; H, 6.07.

EXAMPLE 3

N-3-[5'-(3'',5''-Dibromophenyl)-2'H-tetrazole]propionylpiperidine

Using the procedure of Example 1, there was obtained from 10 g. (0.027 mole) of 3-[5'-(3'',5''-dibromophenyl)-2'H-tetrazole]propionic acid, 9.5 g. (81 percent) of N-3-[5'-(3'',5''-dibromophenyl)-2'H-tetrazole]propionylpiperidine, mp. 115° C., after recrystallization from aqueous methanol.

Calculated for $C_{15}H_{17}Br_2N_5O$: C, 40.61; H, 3.86.
Found: C, 40,86; H, 3.78.

EXAMPLE 4

N-3-[5'-(3''-Chlorophenyl)-2'H-tetrazole]propionylpiperidine

Using the procedure of Example 1, there was obtained from 5 g. (0.02 mole) of 3-[5'-(3''-chlorophenyl)-2'H-tetrazole]propionic acid, 3.3 g. (52 percent) of N-3-[5''ΦΘ'3''-chlorophenyl)-2'H-tetrazole]-propionyl-piperidine, mp. 70° C., after recrystallization from heptane.

Calculated for $C_{15}H_{18}ClN_5O$: C, 56.33; H, 5.64.
Found: C, 56.79; H, 5.82.

EXAMPLE 5

N-3-[5'-(3'',5''-Dichlorophenyl)-2'H-tetrazole]propionylpyrrolidine

Using the procedure of Example 1 and pyrrolidine instead of piperidine there was obtained from 8.8 g. (0.031 mole) of 3-[5'-(3'',5''2'H-tetrazole]propionic acid 5 g. (48 percent) of N-3-[5'-(3'',5''Φ<-dichlorophenyl-2'H-tetrazole]propionylpyrrolidine, mp. 92° C., after recrystallization from aqueous methanol.

Calculated for $C_{14}H_{15}Cl_2N_5O$: C, 49.42; H, 4.44.
Found: C, 49.40; H, 4.61.

EXAMPLE 6

N-3-[5'-3''-Bromophenyl)-2'H-tetrazole]propionylmorpholine

Using the procedure of Example 1 and morpholine instead of piperidine there was obtained from 7 g. (0.024 mole) of 3-[5'-(3''-bromophenyl)-2'-H-tetrazole]propionic acid, 6 g. (68 percent) of N-3-[5'-(3''-bromophenyl)-2'H-tetrazole]propionylmorpho line, mp. 129° C., after recrystallization from aqueous methanol.

Calculated for $C_{14}H_{16}BrN_5O_2$: C, 45.91; H, 4.40.
Found: C, 45.90; H, 4.57.

EXAMPLE 7

N-3-[5'-(3''-Bromophenyl)-2'H-tetrazole]propionylpyrrolidine

Using the procedure of Example 1 and pyrrolidine instead of piperidine there was obtained from 17 g. (0.057 mole) of 3-[5'-(3''-bromophenyl)-2' H-tetrazole]propionic acid, 7.1 g. (36 percent) of N-3-[5'-(3''-bromophenyl)-2' H-tetrazole]propionylpyrrol idine, mp. 70° C., after recrystallization from heptane.

Calculated for $C_{14}H_{16}BrN_5O$: C, 48.01: H, 4.62.
Found: C, 48.25; H, 5.00.

What is claimed is:

1. A compound selected from the group consisting of compounds of the formula:

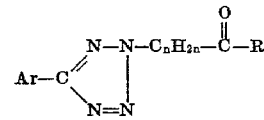

in which Ar is halophenyl, n is 1 to 4 and R is piperidino, pyrrolidino or morpholino.

2. A compound according to claim 1 which is N-3-[5'-(3''-bromophenyl)-2'H-tetrazole]propionyl-piperidine.

3. A compound according to claim 1 which is N-3-[5'-(3''-fluorophenyl)-2'H-tetrazole]propionyl-piperidine.

4. A compound according to claim 1 which is N-3-[5'-(3'',5''-dibromophenyl)-2'H-tetrazole]propionyl-piperidine.

5. A compound according to claim 1 which is N-3-[5'-(3''-chlorophenyl)-2'H-tetrazole]propionyl-piperidine.

6. A compound according to claim 1 which is N-3-[5'-(3'',5''-dichlorophenyl)-2'H tetrazole]propionylpyrrolidine.

7. A compound according to claim 1 which is N-3-[5'-(3''-bromophenyl)-2'H-tetrazole]propionyl-morpholine.

8. A compound according to claim 1 which is N-3-[5'-(3''-bromophenyl)-2'H-tetrazole]propionylpyrrolidine.

* * * * *